United States Patent
Shaw et al.

(10) Patent No.: US 7,565,312 B1
(45) Date of Patent: Jul. 21, 2009

(54) TAX RETURN SYSTEMS AND METHODS

(75) Inventors: Neal Shaw, Shawnee, KS (US); Aaron Horvath, Ladera Ranch, CA (US)

(73) Assignee: H&R Block Services, Inc., Kansas City, MO (US)

( * ) Notice: Subject to any disclaimer, the term of this patent is extended or adjusted under 35 U.S.C. 154(b) by 687 days.

(21) Appl. No.: 11/162,193

(22) Filed: Aug. 31, 2005

Related U.S. Application Data

(60) Provisional application No. 60/640,553, filed on Dec. 30, 2004.

(51) Int. Cl.
*G07F 19/00* (2006.01)
*G06F 17/22* (2006.01)

(52) U.S. Cl. .......................................... 705/31; 705/30

(58) Field of Classification Search ........................ None
See application file for complete search history.

(56) References Cited

U.S. PATENT DOCUMENTS

| | | | | |
|---|---|---|---|---|
| 5,423,033 | A | 6/1995 | Yuen | 395/600 |
| 5,649,115 | A | 7/1997 | Schrader et al. | 395/233 |
| 5,842,185 | A | 11/1998 | Chancey et al. | 705/40 |
| 5,903,881 | A | 5/1999 | Schrader et al. | 705/42 |
| 6,032,137 | A | 2/2000 | Ballard | 705/75 |
| 6,314,415 | B1 | 11/2001 | Mukherjee | 706/47 |
| 6,360,208 | B1 | 3/2002 | Ohanian et al. | 705/31 |
| 6,411,938 | B1 | 6/2002 | Gates et al. | 705/30 |
| 6,446,048 | B1 | 9/2002 | Wells et al. | 705/35 |
| 6,473,741 | B1 * | 10/2002 | Baker | 705/31 |
| 6,567,789 | B1 | 5/2003 | Baker | 705/31 |
| 6,611,809 | B1 | 8/2003 | McCalden | 705/7 |
| 6,687,681 | B1 | 2/2004 | Schulz | 705/36 |
| 2002/0013747 | A1 | 1/2002 | Valentine et al. | |
| 2002/0091602 | A1 | 7/2002 | Stern et al. | |
| 2002/0111888 | A1 | 8/2002 | Stanley et al. | |
| 2002/0133410 | A1 | 9/2002 | Hermreck et al. | |
| 2003/0233296 | A1 * | 12/2003 | Wagner | 705/31 |
| 2004/0078271 | A1 | 4/2004 | Morano et al. | |

(Continued)

OTHER PUBLICATIONS

Furey et al., "On-line broker-dealers: conducting compliance reviews in cyberspace", Business Lawyer, vol. 56, No. 4, Aug. 2001.*

(Continued)

*Primary Examiner*—F. Zeender
*Assistant Examiner*—Christopher Buchanan
(74) *Attorney, Agent, or Firm*—Standley Law Group LLP

(57) ABSTRACT

The present invention is integrated tax return preparation systems and methods that provide a taxpayer with options related to review and signing of a tax return by a tax professional. The integrated systems and methods are computer-based and web-based online tax return preparation systems and tax software used by taxpayers to prepare their own electronic tax returns. Communications with a tax professional and various forms of automated electronic communications are supported so that taxpayers that prepare their own tax returns using a self-preparation tax product may have them reviewed and signed by a tax professional. Signature and review service options that are available from a retail tax preparation service and typically available to only customers of the tax preparation service are also provided to taxpayers who prepare their own tax returns using an online tax preparation system or tax software.

14 Claims, 1 Drawing Sheet

U.S. PATENT DOCUMENTS

| | | |
|---|---|---|
| 2004/0078307 A1 | 4/2004 | Carver |
| 2004/0083145 A1 | 4/2004 | Kobayashi et al. |
| 2005/0033690 A1* | 2/2005 | Antognini et al. ............. 705/40 |
| 2005/0209939 A1* | 9/2005 | Joseph et al. ................ 705/31 |
| 2006/0036528 A1* | 2/2006 | Harnsberger ................ 705/35 |

OTHER PUBLICATIONS

Dunn et al., "Marketing high tech services", Review of Business, vol. 24, No. 1, Winter 2003.*

* cited by examiner

TAX RETURN SYSTEMS AND METHODS

CROSS-REFERENCE TO RELATED APPLICATIONS

This application claims the benefit of U.S. Provisional Patent Application No. 60/640,553 filed Dec. 30, 2004.

FIELD OF THE INVENTION

The present invention relates generally to systems and methods for preparing tax returns. In particular, the present invention relates to integrated tax return preparation systems and methods that support remote tax return signature services.

BACKGROUND OF THE INVENTION

There are many products and services that are available today to help taxpayers prepare and file their tax returns with federal and state taxing authorities. One option available to taxpayers is a tax preparation service such as H&R Block Tax Offices. To use the tax preparation service, the taxpayer takes his tax return documents to a tax preparation office and meets with a tax professional who conducts an in-person interview to learn about the taxpayer's current tax situation. The tax professional then prepares the taxpayer's tax return based on the information provided by the taxpayer and signs the return identifying him or herself as the tax preparer of record. The tax professional may then arrange to file the tax return electronically or by regular mail. Alternatively, the completed tax return may be forwarded to the taxpayer for filing.

Another option available to taxpayers is an online tax preparation system such as H&R Block Online Tax Preparation System. With this option, the taxpayer creates an account at a web site and completes an online interview during which the online tax preparation system collects the taxpayer's tax data. The online tax preparation system then automatically calculates the taxpayer's tax liability, checks for problems, and prepares the proper tax forms for the taxpayer's return. The taxpayer may then review the completed tax forms. The taxpayer may further arrange to electronically file the federal tax return or file it by regular mail.

Yet another option available to taxpayers is tax preparation software such as H&R Block TaxCut for use on a personal computer. The tax preparation software collects tax return data from the taxpayer (e.g., by prompting the user for information), prepares the return, saves the return, and allows the taxpayer to electronically file the tax return or to print forms to be submitted to various tax authorities by regular mail.

Although taxpayers have several options for preparing and filing their tax returns, they are typically distinct and require the taxpayer to select one over the others. Because the tax preparation channels are distinct, taxpayers who choose one preparation method do not have access to the benefits and advantages of the other preparation method. Taxpayers who prepare their returns using a self-preparation product such as an OTPS or tax software have few, if any, opportunities to interact with a tax professional. For example, a taxpayer who uses the OTPS or tax software does not have an opportunity to have his or her tax return reviewed and optionally signed and efiled by a tax professional. Therefore, there is a need for integrated tax return preparation systems and methods that allow data to be transferred between tax return preparation systems to support professional tax return signature and filing services.

SUMMARY OF THE INVENTION

The present invention is integrated tax return preparation systems and methods that allow a taxpayer to choose a first tax preparation system to prepare a tax return and to take advantage of signature features and functionality available from a second tax preparation system. The integrated systems and methods support multiple communication channels such as communications with a tax professional and electronic communications so that taxpayers may obtain benefits and advantages from both tax preparation systems. For example, a taxpayer may use a self-preparation product to prepare the tax return and then submit it to a tax professional for review and an optional signature from the tax professional.

The present invention is based on various known tax preparation systems and methods including the following:

TABLE 1

| Tax System or Service | Description |
|---|---|
| Retail Tax Preparation System (RTPS) | Software used by tax professionals at retail tax preparation offices such as H&R Block to prepare and optionally file tax returns for retail taxpayer customers. |
| Online Professional Tax Service (PTS) | Service which allows a taxpayer to enter information online, to submit tax documents online or via fax, and to interact with a tax professional who communicates with the taxpayer, completes, and optionally signs the taxpayer's tax return and/or files it with a taxing authority. |
| Online Tax Preparation System (OTPS) | Online software accessible to a taxpayer through a web site and used by the taxpayer to prepare and file an electronic tax return. |
| Tax Software | Standalone software sold to taxpayers through retail stores or the web, loaded onto to a personal computer, and used by a taxpayer to prepare and file an electronic tax return. |

The present invention comprises various tax return preparation options and related review and signature options. A taxpayer who selects a self-preparation product is provided with a tax professional review and signature option. The taxpayer's tax return data may be transferred from a self-preparation product to a tax professional that uses a RTPS to review the tax return and notify the taxpayer of any concerns or problems. The taxpayer also has the option of having the tax professional sign the tax return as the tax preparer of record and efile the tax return.

DESCRIPTION OF EXAMPLE EMBODIMENTS

Figure 1:
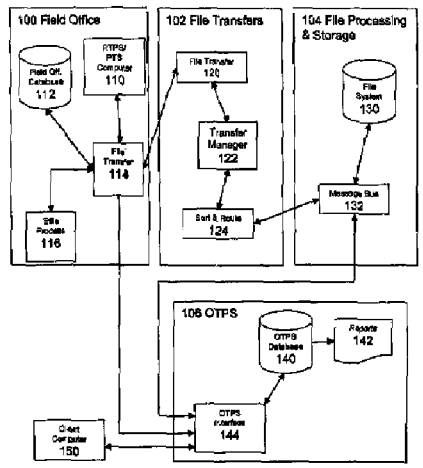
FIG. 1 is a system architecture diagram for an example embodiment of the present invention.

Referring to FIG. 1, a system architecture diagram for an example embodiment of the present invention is shown. The present invention comprises multiple client and server computers, databases, and communication links in order to provide various tax return preparation features and functionality. Computers may be organized into subnetworks or subsystems such as field office (retail tax office) computers 100, file transfers system 102 (using a commercially available product such as the Marimba® Castanet® product), file processing and storage system 104, and online tax preparation system (OTPS) 106 that together comprise a complete network of computers to support the various tax return preparation options of the present invention. Communication links between the subnetworks or subsystems comprise a file transfers system 102 and file processing and storage system 104 that allow taxpayer data, tax return data, and tax professional data to be transferred between computers as needed so that taxpayers are served according to their preferences.

As shown in FIG. 1, a field office (or retail tax office) system 100 comprises a plurality of client computers such as 1) a Retail Tax Preparation System (RTPS)/online Professional Tax Service (PTS) computer 110 that may be used by a tax professional who interacts with taxpayers and who completes tax returns and optionally files them with taxing authorities and 2) an efile process computer 116 that may be used by a tax professional to electronically file tax returns with taxing authorities. The RTPS/PTS computer 110 and efile process computer 116 may be served by a field office database 112. In an example embodiment of the present invention, the database 112 is a Microsoft® SQL Server Data Engine (MSDE). The field office 110 may further comprise a file transfer component 114 for facilitating file transfers of data to and from other computers.

The RTPS software employed by tax professionals at retail or field offices may comprise the following features and functionality:

TABLE 2

RTPS Functionality

Automate preparation of tax returns using a specific tax preparation flow:

1. initialize tax return using taxpayer's identification information such as a SSN
2. import tax data from a previous year into RTPS if the data is available locally and modify data as needed
3. diagnose state of correctness or completeness of the tax return and correct errors
4. calculate federal and state income tax due or refund
5. generate federal and state tax documents and taxpayer's copies
6. generate proper data for e-filing the federal and/or state return
7. check the return filing method
8. calculate tax preparation fees for billing
9. provide other products or services and/or advice to taxpayer
10. process the return to the IRS by printing or efiling the return Manage prepared taxpayer returns and completed transactions:

1. track tax returns prepared in field office
2. track other transactions completed in field office
3. sort tax returns based on type, origin, and status of completion
4. export, import, copy, delete, and edit tax returns
5. provide access to tax return receipt
6. generate reports to summarize field office activity and activity of each tax professional
7. provide access to tax return historical data The PTS software employed by tax professionals at retail or field offices may comprise the following features and functionality:

TABLE 3

PTS Functionality

Provide professional tax services (PTS) by using online capabilities that allow PTS-graded tax professionals in the field office to communicate with online taxpayers via a central online tax preparation system:

1. allow PTS preparers to check for new online taxpayer requests for servicing
2. allow PTS preparers to examine the status of taxpayer requests currently in service TABLE 3-continued PTS Functionality 3. allow PTS preparers to download a taxpayer tax return started online and to complete the return using a retail tax preparation system
4. allow PTS preparers to upload complete tax returns to an online tax preparation system for taxpayer approval
5. allow PTS preparers to download a tax return (prepared using an online tax preparation system or tax software) for completion by a tax professional or professional review in a field office
6. allow PTS preparers to communicate with taxpayers through message boards
7. allows PTS preparers to receive messages broadcast from the world headquarters
8. provide PTS preparers with access to tax calculators
9. provide PTS preparers with access to library for printing tax documents An online tax preparation system (OTPS) 106 supports a web site accessible to taxpayers who would like to prepare their own electronic tax returns. The OTPS 106 comprises an OTPS interface component 144, an OTPS database 140 for storing taxpayer data and related tax return data, and a reports component 142 for generating reports related to use of the OTPS. The OTPS interface component 144 supports the taxpayer's interactions through a client computer 150 with a web site to receive tax data from the taxpayer and prepare an electronic tax return. The OTPS interface component 144 also interacts with a file processing and storage system 104 for transferring tax data (via a message bus 132) to a file transfers system 102 (via a sort and route component 124, transfer manager component 122, and file transfer component 120) and then to a field office system 100. Taxpayers that use tax software for preparation and filing of their tax returns may be provided with access to OTPS 106 so that they can upload and store their completed tax returns or tax data at the OTPS database 140.

Figure 2:
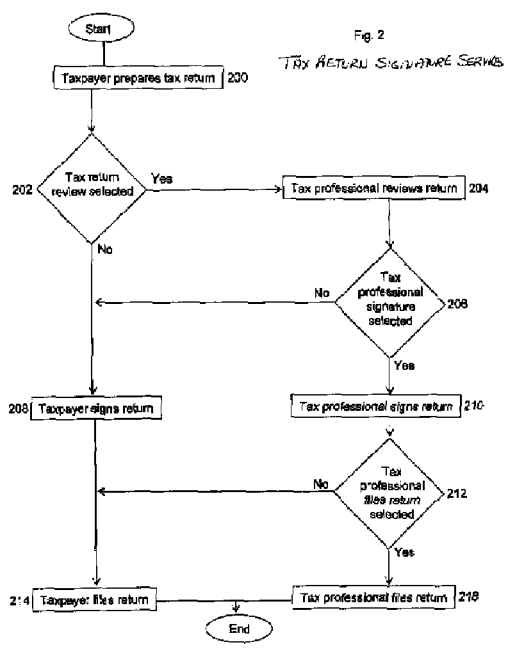
FIG. 2 is a flow diagram for a review and signature tax service according to an example embodiment of the present invention.

Referring to FIG. 2, a flow diagram for a review and signature tax service according to an example embodiment of the present invention is shown. The taxpayer prepares a tax return using a self-preparation product such as an OTPS or tax software 200. The system or software automatically calculates a tax liability, checks for problems, and prepares the proper tax forms for the tax return. The taxpayer may then elect to take advantage of a tax professional review and optional signature service. While preparing the tax return, the taxpayer may be given multiple opportunities to select the option. For example, a checklist appearing at the bottom of one or more screens in the OTPS or tax software may allow the taxpayer to select an option to have a tax professional "review my return" and to a have a tax professional "sign my return." The tax return is then reviewed and optionally signed according to the taxpayer's preferences.

If the taxpayer decides not to have the tax return reviewed or signed 202, the taxpayer signs the return 208 and files it 214. If the taxpayer selects an option to have the tax return reviewed by a tax professional 202, the completed forms are submitted to a tax professional for review 204. The forms are transferred from the self-preparation product to a computer accessible to the tax professional. If the tax return was prepared using an OTPS, the return may be transferred from an OTPS to a RTPS computer where the tax professional may access and review it. If the tax return was prepared using tax software, the taxpayer uploads the completed tax return to the OTPS and it is transferred to a RTPS computer so that the tax professional may access and review it. Once the option is selected, the taxpayer may be asked to create an online account and to provide contact and other information so that the tax return forms may be submitted to the tax professional using the RTPS computer.

The taxpayer may further select an option to have the tax professional sign the tax return as the tax preparer 206. By signing the tax return as the tax professional, the tax professional agrees to respond to tax authority inquiries regarding preparation of the tax return. If the taxpayer does not select the signature option 206, the taxpayer signs 208 and files the tax return 214. If the taxpayer selects the signature option 206, the tax professional signs the return as the tax preparer 210. Finally, the taxpayer has the option of having the tax professional file the return 212. The taxpayer may file the tax return that has been signed by the tax professional as the tax preparer 214 or the tax professional may file the signed tax return for the taxpayer 216.

In an example embodiment of the present invention, features and functionality of an OTPS, RTPS, and PTS infrastructure are combined to provide electronic tax return preparation as well as review and signature services. The OTPS may be used by a taxpayer to prepare an electronic tax return. Electronic tax return data may be routed from OTPS to a field office for review and an optional signature by a tax professional.

While example embodiments of the invention have been illustrated and described, various modifications and combinations can be made without departing from the spirit and scope of the invention. For example, the features and functionality of each tax preparation system (retail tax preparation system, professional tax service, online tax preparation system, and tax software) may be modified and fall within the scope of the present invention. Furthermore, the features and functionality of the tax preparation systems and other systems may be provided in more or fewer systems than described according to an example embodiment of the present invention. Modifications, combinations, and equivalents to the system and method of the present invention are intended to be covered and claimed.

What is claimed is:

1. A computerized method for obtaining a tax professional signature on a tax return comprising:
   preparing using a client computer an electronic tax return, said electronic tax return prepared by a taxpayer using a self-preparation product on said client computer;
   prompting said taxpayer from said self-preparation product to select a signature service option;
   receiving at said self-preparation product said taxpayer's selection of said signature service option;
   connecting said client computer to an online tax preparation system;
   transferring said electronic tax return from said client computer to said online tax preparation system;
   storing said electronic tax return at said online tax preparation system;
   transferring said electronic tax return from said online tax preparation system to a retail tax preparation system;
   providing a tax professional with access to said electronic tax return using said retail tax preparations system to permit said tax professional to review and sign said electronic tax return as tax preparer; and
   filing said electronic tax return signed by said tax professional as tax preparer.

2. The computerized method of claim 1 wherein preparing using a client computer an electronic tax return comprises preparing an electronic tax return using said online tax preparation system.

3. The computerized method of claim 1 wherein preparing an electronic tax return using a client computer comprises preparing an electronic tax return using tax software.

4. The computerized method of claim 1 wherein filing said electronic tax return comprises filing said electronic tax return by said tax professional.

5. The computerized method of claim 1 wherein filing said electronic tax return comprises filing said electronic tax return by said taxpayer.

6. A computerized system for obtaining a tax professional signature on a tax return comprising:
   a self-preparation product for use with a client computer to prepare an electronic tax return, said electronic tax return prepared by a taxpayer;
   a signature service option in said self-preparation product for selection by said taxpayer to request assistance from a tax professional;
   a signature service option selection received by said self-preparation product indicating said taxpayer's request for assistance;
   a connection between said client computer and an online tax preparation system for transferring said electronic tax return from said client computer to said online tax preparation system;
   a transfer component at said online tax preparation for transferring said electronic tax return from said online tax preparation system to a retail tax preparation system;
   a computer for use by said tax professional to:
   1) access said electronic tax return through said retail tax preparation system; and
   2) review and sign said electronic tax return in response to said taxpayer's selection of said signature service option.

7. The computerized system of claim 6 wherein said self-preparation product is an online tax preparation system.

8. The computerized system of claim 6 wherein said self-preparation product is tax software.

9. The computerized system of claim 6 further comprising an efile process for filing said electronic tax return.

10. The computerized system of claim 6 wherein said signature service option further comprises an option for having said tax professional sign said electronic tax return as tax preparer.

11. The computerized system of claim 10 wherein said signature service option further comprises an option for having said tax professional file said electronic tax return.

12. The computerized system of claim 6 further comprising a notification from said retail tax preparation system to said taxpayer of problems regarding said electronic tax return.

13. The computerized system of claim 6 wherein said signature service option is offered a plurality of times in said self-preparation product.

14. The computerized method of claim 1 wherein prompting said taxpayer from said self-preparation product to select a signature service option comprises prompting said taxpayer a plurality of times.

* * * * *